Figure 8:
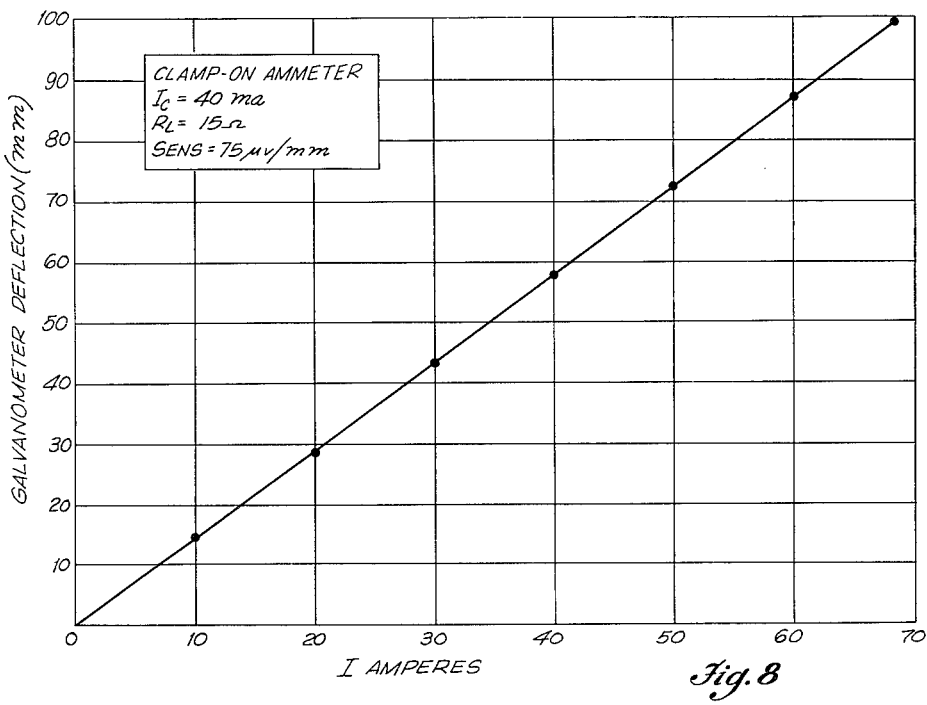

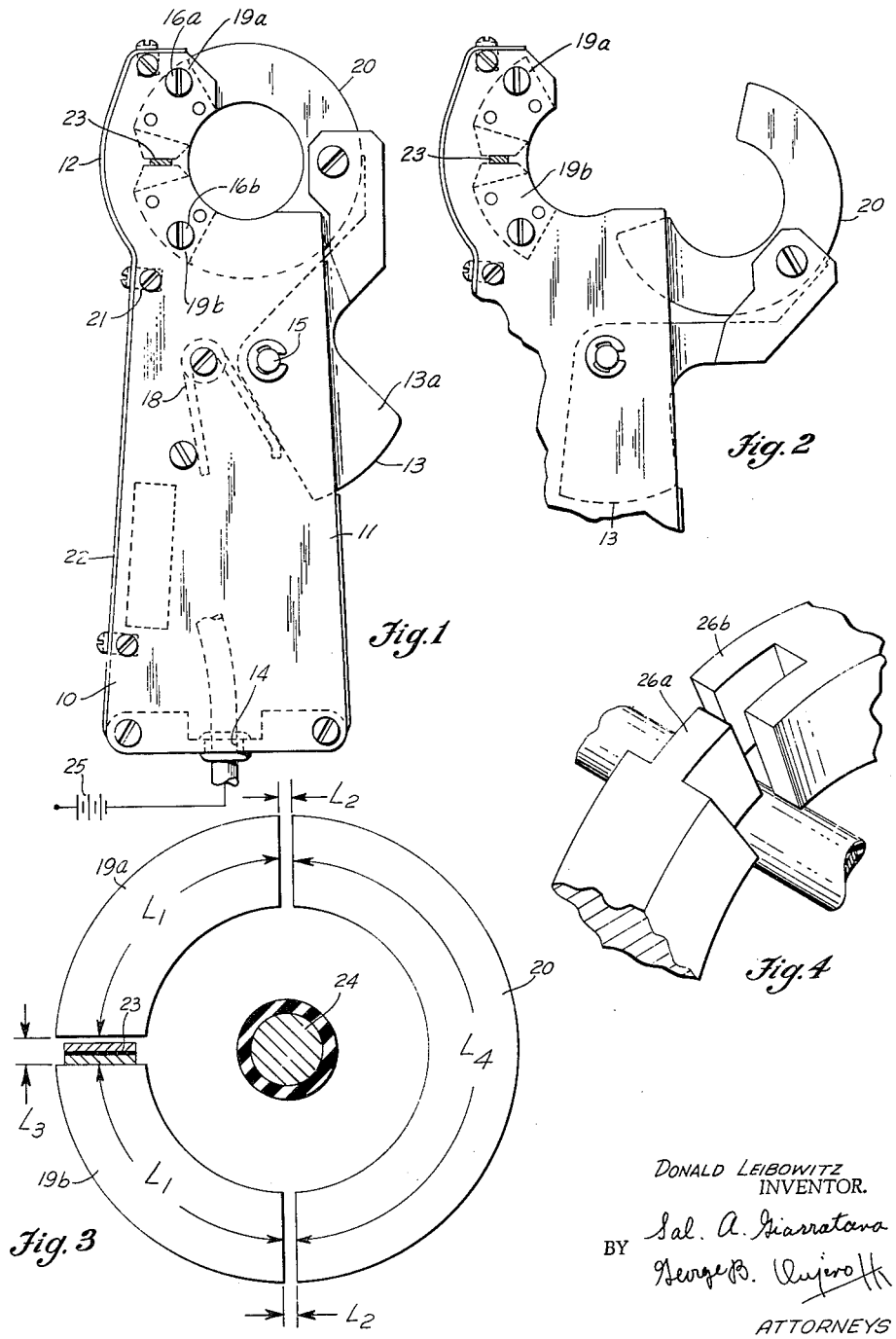

DONALD LEIBOWITZ
INVENTOR.

Aug. 3, 1965   D. LEIBOWITZ   3,199,026
D.-C. CLAMP-ON METER INCLUDING A HALL PLATE FLUX DETECTOR
Filed May 1, 1961   3 Sheets-Sheet 3

DONALD LEIBOWITZ
INVENTOR.

BY Sal A. Giarratana
George B. Oujerott
ATTORNEYS

United States Patent Office 3,199,026
Patented Aug. 3, 1965

3,199,026
D.-C. CLAMP-ON METER INCLUDING A HALL PLATE FLUX DETECTOR
Donald Leibowitz, Bronx, N.Y., assignor to General Precision Inc., Little Falls, N.J., a corporation of Delaware
Filed May 1, 1961, Ser. No. 106,759
5 Claims. (Cl. 324—127)

The present invention relates to ammeters for the measurement of direct current, and more particularly to an ammeter which is placed or clamped on a current-carrying wire without cutting into the wire or circuit to be measured.

It is well known that an alternating current flowing in a conductor will establish and be encircled by an alternating magnetic field. Faraday's law of induced voltage indicates that the varying magnetic field thus created will induce a voltage in a coil of wire provided the coil is properly positioned with respect to the magnetic field. These physical phenomena provide the basis for the convenient and inexpensive non-destructive measurement of alternating currents.

The non-destructive measurement of direct currents obviously cannot be accomplished with the aid of induced voltages or transformer action. Theoretically, the Hall-effect presents a method of measuring the static magnetic field surrounding a direct current carrying wire. When a current is passed through a crystal, which is in a magnetic field, a potential difference $V_H$ appears across the crystal. Or, an electric field $E_z$ is developed in the $z$ direction when a current of the density $I_x$ flows in the $x$ direction through a magnetic field $B_y$ in the $y$ direction. This potential difference is called the Hall voltage or $V_H$. The Hall effect, i.e., the production of the Hall voltage $V_H$, has heretofore been regarded as a scientific curiosity. Fairly large components have been required to produce a measurable effect. Thus, little use has been found for this phenomenon in D.-C. measurements. Although with the recent improvements in semiconductor crystal materials, the effect has been increased and thus made more measurable, the construction of a clamp-on ammeter for direct current measurement has presented certain difficulties.

It has now been discovered that use can successfully be made of the Hall-effect to carry out D.-C. measurement technique.

Thus, an object of the present invention is to provide external means for measuring D.-C. currents in a circuit without physically disturbing the circuit.

Another object of the present invention is to provide a clamp-on ammeter.

With the foregoing and other objects in view, the invention resides in the novel arrangement and combination of parts, and in the details of construction hereinafter described and claimed, it being understood that changes in the precise embodiment of the invention herein disclosed may be made within the scope of what is claimed without departing from the spirit of the invention.

Broadly stated, the present invention contemplates a D.-C. ammeter and in general comprises in combination, clamp means including a fixed and movable clamp member; inner and outer magnetic pole pieces on said fixed clamp member, both having arcuate pole faces to partially encircle a cable at right angles thereto; a movable magnetic pole piece likewise having an arcuate shaped flat face adapted to cooperate with said fixed pole pieces arcuate faces so as to encircle a cable between all said faces; a Hall crystal disposed between said inner and outer fixed pole pieces; and, Hall crystal excitation means adapted to send a Hall excitation current through the crystal at right angles to the magnetic field created by a current carrying encircled by said pole faces.

Figure 5:
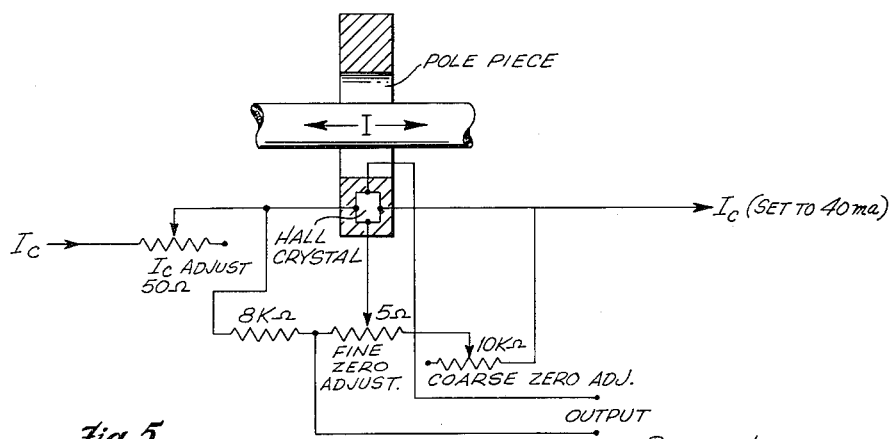
Figure 7:
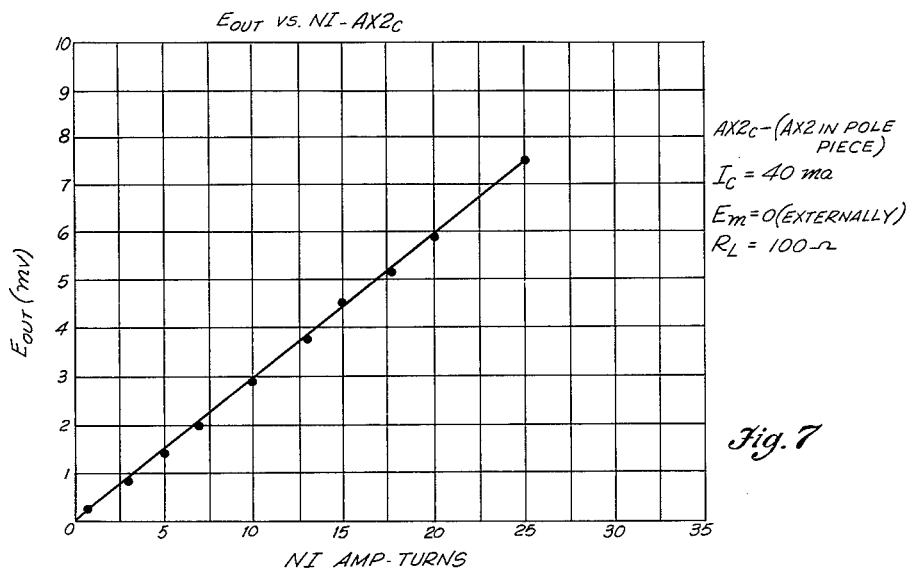
Figure 6:
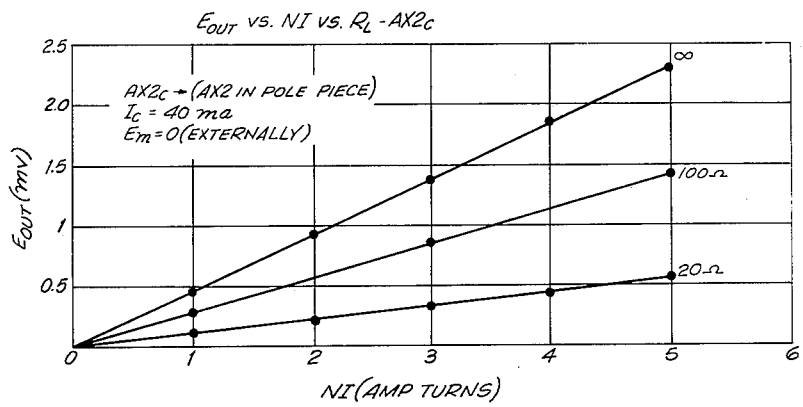

The advantages of the invention will become apparent from the following description taken in conjunction with the accompanying drawing in which:

FIG. 1 shows a longitudinal front view of the device herein contemplated in the closed position;
FIG. 2 depicts the device of FIG. 1 in the open position;
FIG. 3 is a schematic representation of the device herein contemplated for the purposes of mathematical computation;
FIG. 4 illustrates the mechanical feature of the closing position;
FIG. 5 presents in schematic form the components required to adjust the device herein contemplated; and
FIGS. 6 to 8 are graphs relating to the calibration of the device.

The ammeter 10 shown in the drawing has a housing 11 in the shape of a handle. The handle terminates in one part of a clamp i.e., fixed clamp holder 12 which is shown as forming part of the handle, or, the clamp may be separately affixed thereto. Also, there is an opening 14 through the handle for passing circuitry wires there through. Co-operating with the fixed clamp holder is a movable clamp holder 13 pivotly affixed to said handle-shaped housing 11 by pivot means 15. Movable clamp holder 13 can be moved to and away from the fixed clamp holder by means of a thumb actuation pressure extension 13a thereon. Spring means 18 tend to maintain said moveable clamp holder towards said fixed clamp holder. Mounted on fixed clamp holder 12 are inner and outer magnetic pole pieces 19a and 19b. These two poles pieces are arcuate in shape and form a portion of a clamp ring. The outer pole piece 19a has one member 26a of a pair of interleaving mating members at the outer end thereof. Cooperating with the fixed inner and outer pole pieces 19a and 19b is a moveable magnetic pole piece 20 which is mounted on the moveable clamp member 13. At the outer end of the moveable pole piece 20 is the other member 26b of said pair of interleaving mating members. The arcuate pole pieces 19a, 19b and 20 all have faces so shaped as to completely encircle a cable 24 placed therein between. As seen in FIG. 2, the current carrying cable 24 is placed in the center of the ring formed by the pole piece faces by pressing on thumb actuation pressure extension 13a which opens the clamp allowing the cable to be placed in the device. Disposed between inner and outer fixed pole pieces 19a and 19b is a rectangular shaped Hall crystal 23. The Hall crystal is so disposed that one of the rectangular edges thereof will be parallel to the cable encircled by the pole faces. The Hall crystal excitation leads pass through opening 14 in the handle to opposed sides of the crystal so as to send a current through the crystal parallel to the current passing through the cable, i.e., at right angles to the magnetic field created by the current passing through the cable.

When an excitation current source 25 feeds an excitation current through the Hall crystal, the magnetic field created by a current carrying cable encircled by said pole faces will cause a measurable Hall voltage drop across said crystal at right angles to said excitation current and said magnetic field. The magnitude of said Hall voltage drop corresponds to the magnitude of the D.-C. current passing through said cable.

The total reluctance path in a magnetic circuit including parallel and series paths can generally be expressed as $$R = \frac{L}{\mu A}$$

(Frank "Introduction to Electricity and Optics," McGraw Hill, 1950, p. 271), where $\mu$ is the permeability, L is the magnetic length of the path, and A is the cross sectional area of the magnetic path.

The flux is equal to $$\phi = \frac{M.M.F.}{R_T}$$

Where $\phi$ represents the flux in the magnetic circuit, M.M.F. is the magnetomotive force created by the current I in the circuit and $R_T$ is the total reluctance of the circuit.

Looking now at FIGURE 3, there is shown a schematic drawing of the magnetic pole pieces $19a$, $19b$ and $20$ having Hall crystal 23 between fixed pole pieces $19a$ and $19b$. The pole pieces are made of three ring segments, two of these segments, $19a$ and $19b$ being of equal length and are denominated as $L_1$, while the third segment $20$ is shown as Length $L_4$. Between the two ring segments $19a$ and $19b$ is Hall crystal 23 in a gap having a length $L_3$. Between each of the two ring segments $19a$ and $19b$ and ring segment $20$ are two air gaps of equal size shown as $L_2$. Using these factors, the total reluctance (if the cross-sectional areas are all equal) is $$R_T = \left(\frac{2L_1}{\mu_1} + \frac{2L_2}{\mu_2} + \frac{L_3}{\mu_3} + \frac{L_4}{\mu_4}\right) \times \frac{1}{A}$$

Since the Hall voltage is directly proportional to the flux $\phi$, and the Hall voltage is proportional to the control current multiplied by $\phi/A$, the Hall voltage is directly proportional to the I in the wire or cable whose current is to be measured. Using c.g.s. units of $\mu$ of air equal to 1, and $m$ for material, the flux $\phi$ is equal to $$\phi = \frac{1}{A} \frac{I}{\frac{2L_1}{\mu_m} + 2L_2 + L_3 + \frac{L_4}{\mu_m}}$$

From this expression, it is apparent that $\mu_m$ must be much greater than $2L_1$ and $L_4$ and finally, $L_3$ must be much greater than $2L_2$. Under these conditions, the air gap in which the Hall crystal has been placed will be the controlling reluctance path in the magnetic circuit thus enabling the flux to remain constant regardless of the repeatability of performance of opening and closing the clamp so as to encircle the cable. An interleaved closure path shown in FIG. 4 having mating members $26a$ and $26b$ will minimize $L_2$ of FIG. 3.

With regard to the material, what is required is a high initial permeability, a large region of relatively linear permeability, and a high saturation flux density. A properly annealed 48% nickel, balance iron alloy such as Carpenter "49" fits these qualifications because it exhibits a region of relatively linear permeability. Its saturation flux density is upward of 7 kilogauss and its initial permeability is 1,000. A laminated oriented silicon steel may be used to replace the nickel iron alloy. Thus, Trancor XXX and oriented M7X have a linear permeability region up to 17,000 gauss.

The Hall crystal must have great sensitivity, since the greater the sensitivity of the Hall crystal, the less demanding will be the requirements on any amplifier used in the system output. For the present application, it is preferable to use low resistivity germanium (.5 to 1 ohm cm.) which has a high Hall coefficient as well as inherent temperature stability. The crystal must be oriented so as to give the least magnetoresistive effect. Preferably, the crystal is placed between a brass sandwich which serves as a heat sink as well as a structural member. In the device shown in the drawing, a crystal having the following characteristics has been found satisfactory.

Resistance (control) _____ 63 ohms.
Resistance (Hall) _____ about 65 ohms.
Sensitivity at .2 watt _____ about 0.45 mv./gauss.
The sensing area _____ about .250" x .250".

The positioning of the Hall probes on the same equal potential line with respect to the input field is practically impossible. As a result of this misalignment, a voltage drop is measured at the Hall terminals which is a function of the control current, the crystal resistivity and the physical distance of misalignment. In the operation of the clamp-on ammeter, a zeroing circuit is advantageous to suppress the misalignment voltage prior to making a current measurement. The procedure used in connection with the present embodiment is to bring the output to a null across a resistor bridge in the absence of an input to be measured. As shown in FIG. 5, the excitation current has been set to 40 ma. In parallel to the Hall crystal are an 8K resistor, a 5 ohm potentiometer, and a 10K potentiometer. A coarse adjustment is first obtained using the 10K potentiometer. The null or zero is then obtained using the 5 ohm potentiometer. The device of FIGS. 1 and 2 has of course only a limited deflection range. In order to measure a wide range of amperages, attenuation must be provided in the Hall voltage output circuit as shown in FIG. 5. The attenuation merely consists in placing a resistor in series with the measuring ammeter or amplifier. A table can be provided with the device or even in a small plate right on the handle of the device giving the resistor multiplication values.

The value of the attenuation resistance $R_A$ for high current values may be calculated. Thus, assume the Hall crystal and output circuit to have a total resistance of $R_H$ including the internal resistance of the crystal and the Hall circuit resistance. Without attenuation, the Hall voltage $V_{H_1}$ under conditions of measured current $I_1$ is found by the formula:

$$V_{H_1} = I_1 R_H$$

and $$I_1 = \frac{V_{H_1}}{R_H}$$

If a current much higher than $I_1$ is sensed by the Hall detector, the needle on the indicating instrument will just bang up against the maximum indication and remain there. To measure this current, an attenuating resistor $R_A$ is required. The value of this resistor is found as follows:

$$V_{H_2} = I_2(R_H + R_A)$$

$V_{H_2}$ is equal to $K \times V_{H_1}$ where K is the scale factor or rent $I_2$ when an attenuation resistance $R_A$ is used in the Hall output circuit, but, $V_{H_2}$ is equal to $K \times V_{H_1}$ where K is the scale factor or multiple by which the range in which current $I_2$ is measured exceeds the range in which current $I_1$ is measured. Therefore, $$K \times V_{H_1} = I_2(R_H + R_A)$$

$$I_2 = \frac{K \times V_{H_1}}{R_H + R_A}$$

By equating, $I_2 = I_1$ (the condition necessary for measurement of $I_2$)

$$\frac{V_{H_1}}{R_H} = \frac{K \times V_{H_1}}{(R_H + R_A)}$$

$$\frac{1}{R_H} = \frac{K}{(R_H + R_A)}$$

$$K \times R_H = R_H + R_A$$

$$R_A = K R_H - R_H$$

$$R_A = R_H(K-1)$$

In the present instrument shown in FIGS. 1 and 2, the value of $R_H$ is 163 ohms. It has been found convenient to provide three attenuating resistors for a scale factor of 5 times, 10 times, and 50 times the basic range. These resistors have following values:

Five times $(R_{5A}) = 163 \times (5-1) = 652$ ohms
Ten times $(R_{10A}) = 163 \times (10-1) = 1467$ ohms
Fifty times $(R_{50A}) = 163 \times (50-1) = 7987$ ohms To obtain precision results, it is necessary to periodically check the device, the following example is given so as to give those skilled in the art a better understanding of how to check the device.

*Example*

The data shown in FIG. 6 was obtained using a Rubicon potentiometer model 2745 as the measuring device. The excitation current was supplied by a 12 volt battery whose output voltage was continuously monitored. A continuous measurement of the crystal's excitation current was made during the complete run. A potentiometer in series with the control side of the Hall crystal was adjusted to maintain the same current flowing in the Hall crystal during each measurement. The clamp-on ammeter measured small currents during the tests of 5 amperes or less. Output voltages under three loads were recorded. The loads were 20 ohms, 100 ohms and infinite resistance. The 20 ohm and 100 ohm results were obtained by shunting the potentiometer input. The infinite load was fed directly into the potentiometer. The linearity was better than 1% for each load. The Hall voltage outputs were:

Hall voltage per ampere of current flowing through cable being measured, mv.

Load impedance:
20 _____ .100
100 _____ .275
Infinity _____ .430

Tests were then conducted using a 100 ohm load impedance and currents up to 25 amperes. The results of this test are shown in FIG. 7. Finally, measurements were made using high current carrying conductors and a range of shunt bars to enable measurement up to 100 amperes. A multiflex galvanometer was used as the measurement instrument. The results of this final test are shown in FIG. 8. By using a magnetic amplifier having a 1000 gain, it was possible to measure currents as low as 20 milliamperes. In using the device, it is preferable to use a highly accurate current supply for the excitation current. Usually a 12 volt battery will be satisfactory with the instrument shown in FIGS. 1 and 2. Readout of the Hall voltage can be made on any standard D.-C. vacuum tube voltmeter, e.g., Keithley or galvanometer, e.g., a multiflex galvanometer.

It is to be observed therefore, that the present invention provides for a D.-C. ammeter, comprising in combination, a handle 11 having an opening 14 lengthwise therethrough; a fixed clamp holder 12 affixed to said handle; a moveable clamp holder 13, pivotally affixed to said handle; thumb actuation pressure means 13a on said moveable clamp holder adapted, when pressed, to move said moveable clamp holder to and away from said fixed clamp holder; spring means 18 tending to maintain said moveable clamp holder towards said fixed clamp holder; inner and outer magnetic pole pieces 19a and 19b on said fixed clamp holder, both having arcuate pole faces adapted to partially engage a cable at right angles thereto, the outer fixed pole piece having one member 26a of a pair of interleaving mating members; a moveable magnetic pole piece 20 likewise having an arcuate shaped face adapted to cooperate with said fixed pole pieces arcuate faces so as to encircle a cable between all said faces, and having the other member 26b of a pair of interleaving mating members; a rectangular Hall crystal 23 disposed between said inner and outer fixed pole pieces so that one edge thereof is parallel to a cable encircled by said pole faces; Hall crystal excitation leads passing through said handle opening 14 to opposed sides of said crystal so as to send a Hall excitation current therethrough at right angles to the magnetic field created by a current carrying cable encircled by said pole faces; whereby when an excitation current source 25 feeds an excitation current through said Hall crystals, the magnetic field created by a current carrying cable encircled by said pole faces will cause a measurable Hall voltage drop across said crystal at right angles to said excitation current and said magnetic field, corresponding to the magnitude of the D.C. current passing through said cable.

It will be apparent to those skilled in the art, that my present invention is not limited to the specific details described above and shown in the drawings, and that various modifications are possible in carrying out the features of the invention and the operation and the method of support, mounting and utilization thereof, without departing from the spirit and scope of the appended claims.

I claim:
1. A D.-C. ammeter, comprising in combination, a handle having an opening lengthwise therethrough; a fixed clamp holder affixed to said handle; a moveable clamp holder, pivotly affixed to said handle; thumb actuation pressure means on said moveable clamp holder adapted when pressed to pivotly move said clamp holder to and away from said fixed clamp holder; spring means tending to maintain said moveable clamp holder towards said fixed clamp holder; inner and outer magnetic pole pieces held by said fixed clamp holder, both having arcuate pole faces adapted to partially encircle a cable, the outer fixed pole piece including one member of a pair of interleaving mating members; a pivoting magnetic pole piece having an arcuate shaped face cooperating with said fixed pole pieces arcuate faces so as to encircle a cable between all said faces, and having the other member of said pair of interleaving mating members; a rectangular Hall crystal disposed between said inner and outer fixed pole faces so that one edge thereof is parallel to a cable encircled by said pole faces, said Hall crystal having output leads; Hall crystal excitation leads passing through said handle opening to opposed sides of said crystal so as to send a Hall excitation current therethrough at right angles to the magnetic field created by a current carrying cable encircled by said pole faces; whereby when an excitation current source feeds an excitation current through said Hall crystal, the magnetic field created by a current carrying cable encircled by said pole faces will cause a measureable Hall voltage drop across said crystal at right angles to said excitation current and said magnetic field to provide a signal in said output leads, corresponding to the magnitude of the D.-C. current passing through said cable.

2. A device as claimed in claim 1, said pole pieces being made of an alloy having about 48% nickel and the balance iron.

3. A device as claimed in claim 1, said pole pieces being made of a high permeability oriented silicon steel.

4. A device as claimed in claim 1, said crystal being made of low resistivity germanium oriented in the 100 plane.

5. A device as claimed in claim 1, including a null bridge circuit in parallel with said Hall crystal excitation leads, said circuit comprising a resistor of high value of the order of several thousand ohms, a first potentiometer of high value also of the order of several thousand ohms including a wiper arm therefor, said wiper arm and one end of said potentiometer being in series with said resistor of high value for providing a coarse zero adjustment, and a second potentiometer in series with said resistor of high value and first potentiometer, including a wiper arm on said second potentiometer connected to one of said Hall crystal output leads, said second potentiometer being of a low value of only several ohms to provide a fine zero adjustment.

References Cited by the Examiner

UNITED STATES PATENTS 2,834,941  5/58  Hickok _____ 324—127
2,886,779  5/59  Kuhrt _____ 324—127

FOREIGN PATENTS 1,040,682  10/58  Germany.

WALTER L. CARLSON, *Primary Examiner*.

FREDERICK M. STRADER, *Examiner*.